Dec. 19, 1944.   J. BANNEYER   2,365,620
CONDUIT SUPPORTING DEVICE
Filed April 11, 1942   2 Sheets-Sheet 1
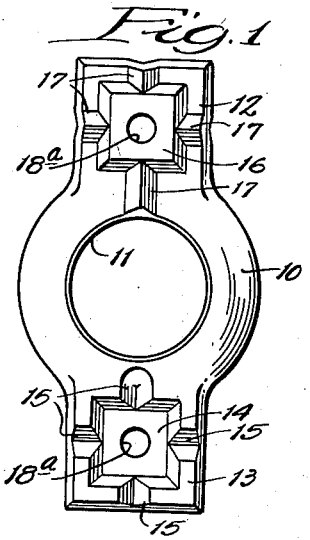
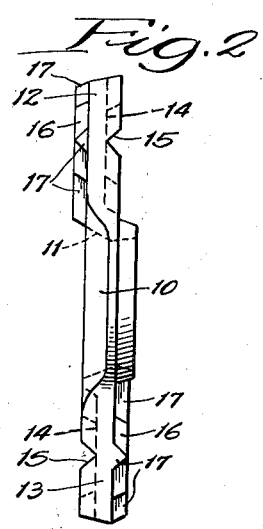
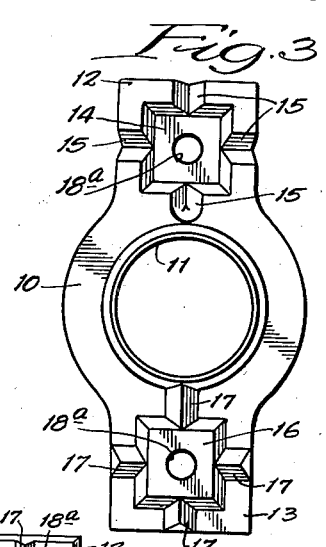
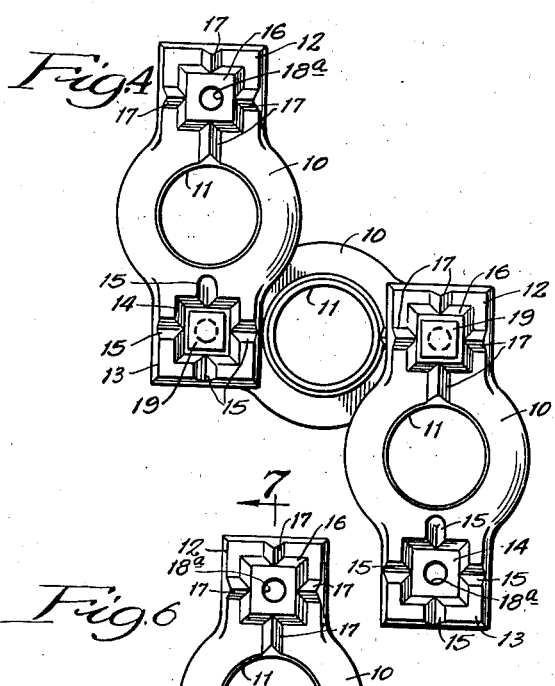
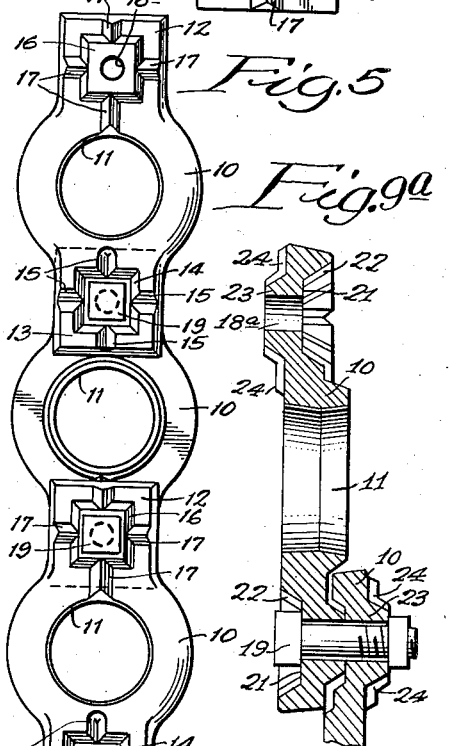
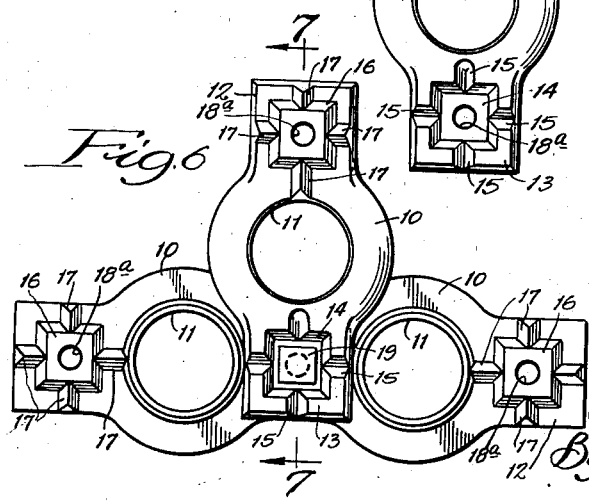
Inventor:
Joseph Banneyer,
By Dawson Ooms & Bortz,
Attorneys.

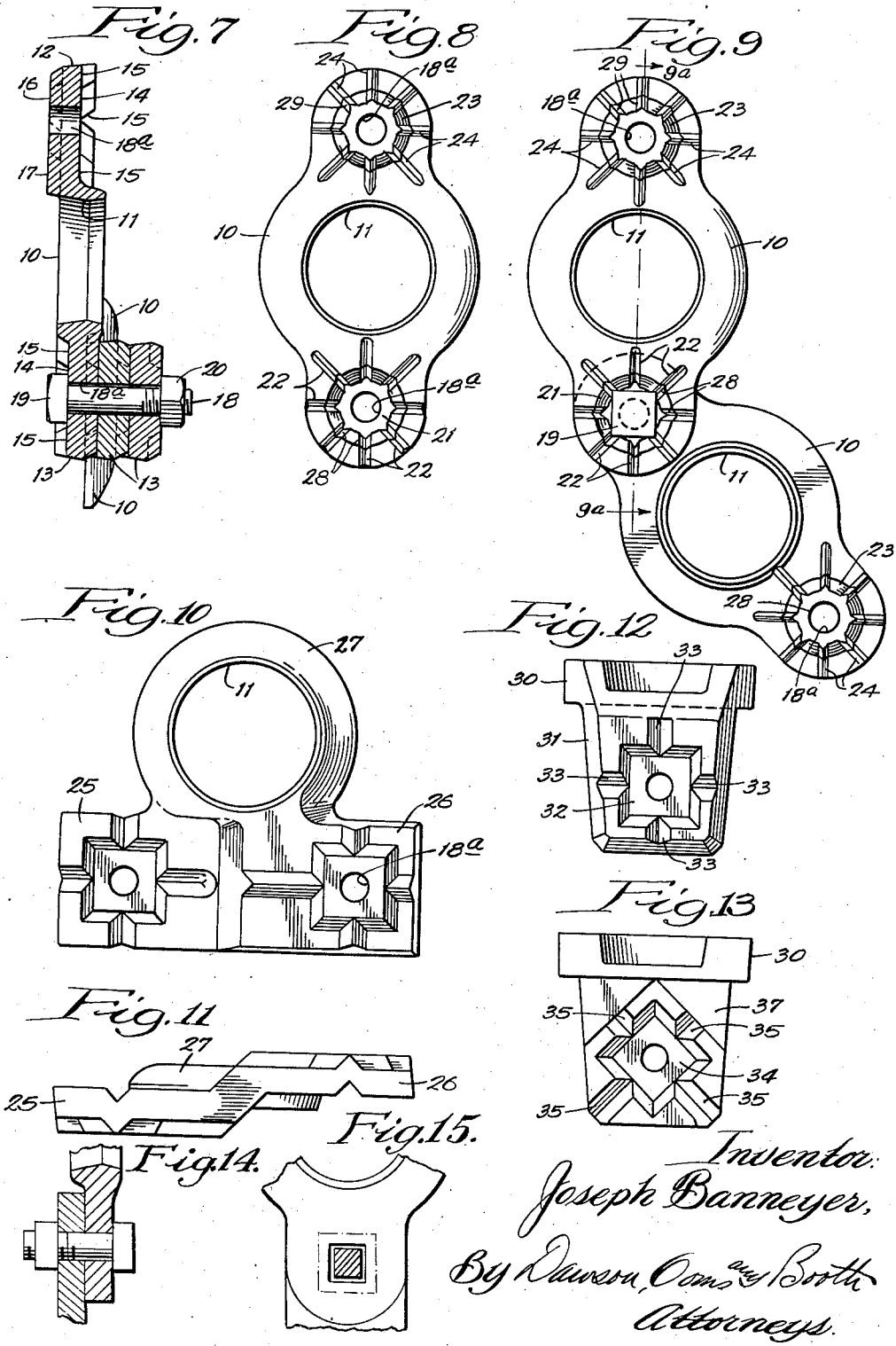

Patented Dec. 19, 1944

2,365,620

UNITED STATES PATENT OFFICE 2,365,620

CONDUIT SUPPORTING DEVICE

Joseph Banneyer, Chicago, Ill.

Application April 11, 1942, Serial No. 438,577

13 Claims. (Cl. 248—68)

This invention relates to conduit supporting devices, and more particularly to a plurality of conduit supporting members adapted to be secured together in a variety of forms to provide supports for electrical conduits and other pipes or conduits in a desired relationship. This application constitutes a continuation-in-part of my co-pending application Serial No. 362,532, filed October 24, 1940, for Conduit supporting devices.

An object of the present invention is to provide conduit supporting members of simple structure which may be readily united to provide a plurality of supporting rings or arms in a variety of relationships. A further object is to provide conduit supporting devices permitting the ready assembly of three or more members in superposed relationship and in a variety of positions. A further object is to provide a simple conduit supporting member of a unique structure which will permit the same to be assembled with similar members to provide supporting arms or rings at different spaced distances from each other and in a variety of different angular arrangements. Other specific objects and advantages will appear as the specification proceeds.

The invention is illustrated in preferred embodiments, by the accompanying drawings, in which—

Figure 1 is a top plan view of a conduit supporting member embodying my invention; Fig. 2, a side view of the member shown in Fig. 1 turned upon its left side; Fig. 3, a bottom plan view of the member shown in Fig. 1 which has been turned upon its left side to reverse the face thereof; Fig. 4, a plan view of three members united in such a manner as to bring the conduit supporting openings close together; Fig. 5, a plan view of three members united in such a manner as to separate the openings at a greater distance; Fig. 6, a plan view of three members united to bring the openings close together and with the ears of three of the members in interlocking arrangement; Fig. 7, a transverse sectional view, the section being taken as indicated at line 7 of Fig. 6; Fig. 8, a plan view of a modified form of conduit supporting member; Fig. 9, a view similar to Fig. 8 but showing two members secured together at an acute angle; Fig. 9ᵃ is a vertical section view taken along the line 9ᵃ—9ᵃ of Fig. 9; Fig. 10, a plan view of a modified form of conduit supporting member; Fig. 11, a side view of the structure shown in Fig. 10 with the ring portion lowermost; Fig. 12, a front view in elevation of a socket or supporting member to which conduit supporting devices may be attached; Fig. 13, a rear elevation of the structure shown in Fig. 12; Fig. 14 is a fragmentary sectional view of a form of the invention in which the ears of the conduit supporting members are provided with rectangular openings which may be aligned to receive a rectangular bolt for locking the ears against rotation with respect to each other; and Fig. 15 is a plan view of the aligned ears with the bolt shown in section.

In the structure shown in Figs. 1 to 7 inclusive, 10 designates the central body of the supporting member providing an opening 11 adapted to receive a conduit. The member is provided with an ear 12 and an ear 13. Each of the ears is provided with a socket portion on one side and with a projecting portion on the other side. The numeral 14 designates the socket portion, and the numeral 15 designates, in the illustration given, angularly-disposed recesses which merge with the socket 14. The numeral 16 designates a projection which corresponds to the socket 14 and with angularly-pitched ribs 17 merging with the projection 16. It will be noted that the socket and projection on one of the ears is just the reverse in position on the other ear; that is, on one face of the member, one ear will have on its upper surface a projecting portion while the other will have the corresponding socket portion, and when the member is turned over the reverse is true.

With this structure, it is possible to arrange the members in a great variety of positions, with the socket of one member receiving a projection of another member. The interlocked ears thus formed may be secured together by any suitable means, such as, for example, a bolt 18 having an integral head 19 and a nut 20 engaging the threaded opposite end of the bolt. The bolt 18 extends through the opening 18ᵃ in each of the ears of the conduit supporting member.

If desired, the socket may be rectangular in shape, or of any other desired shape, so that when it receives a correspondingly-shaped projection, the two members will be locked against relative rotation within the same plane. If desired, the ribs 15 and corresponding recesses 16 may be employed and give greater surface areas for withstanding any twisting stress in the supporting task.

If desired, the socket itself may be round, as illustrated in the modification shown in Figs. 8 and 9, as indicated by the numeral 21, and a plurality of recesses 22 may be caused to merge therewith. A correspondingly-round projection 23 may be employed with a correspondingly-increased number of ribs 24. With this structure, the members may be secured together at angles considerably less than 90°, as illustrated in Fig. 9, a bolt or other suitable means being employed to lock the mating parts together. If desired, the sockets or recesses may be relatively small and the projections correspondingly reduced in size, and the two may be formed in any desired shape so as to provide a rigid interlock when engaged, preventing relative rotation within the same plane.

The ears may be disposed at any angular position about the body of the supporting member. They may be separated by angles of any degree, or they may be supported together with the body portion extending from one side thereof, as illustrated in Fig. 10. Here, the ears 25 and 26 extend in opposite directions, but the body 27 extends substantially at right angles to both ears. In this modification, the two ears 26 and 25 are offset with respect to each other, lying in different planes, while the body 27 of the member extends between, as a uniting link, the centers of the two ears. With this structure, when a corresponding member is brought into interlocking arrangement therewith, the overlapping ear forms a continuation of the ear on the opposite side thereof and the bodies 27 lie within the same longitudinal plane.

The recesses or grooves 22 may not only extend along the face of the ear, but also downwardly into the socket, as shown in Fig. 8. If desired, the groove may extend even through the side and bottom of the socket portion, as indicated by the numeral 28 in Fig. 8. A corresponding rib 29 is formed along the projecting portion of the opposite ear.

As already stated, any suitable means for supporting the depending conduit supporting members may be employed. A specific example is set out in Figs. 12 and 13. Here, a bracket body portion 30 is adapted to be received within any suitable supporting slot or socket, and the member provides a vertically-depending ear 31. The forward face of the ear 31 is provided with a socket 32 and ridges 33 adapted to receive the projecting portion of a conduit supporting member. The bracket member 30 is provided on the reverse side 37 with a similar socket 34 disposed at a 45° angle with respect to the socket 32 whereby the conduit supporting member would be maintained at a diverging angle with respect to the depending ear 31. Merging with the socket 34 are the recesses or grooves 35. While the depending ear portion 31 is shown provided with sockets on opposite sides thereof, it will be understood that projecting portions may be employed if desired. Any suitable surface adapted to interlock with an ear portion of a conduit supporting member may be used in the carrying out of the invention.

It will be understood that the above supporting bracket is merely set forth as illustrative and that many types of supporting devices may be employed.

*Operation*

In the operation of the devices, the members may be brought together in any desired relation with the socket portion of one member receiving a projecting portion on the ear of another member, and the two members being secured together by a relatively short bolt. If desired, the overlapping ears of several members may be brought together in any desired number and longer bolts employed to secure them in fixed relationship.

The assembled links may be secured to a wall or to a bracket member or to any supporting surface by any means or in any desired manner. If desired, a bracket supporting member of the type shown in my said application Serial No. 362,532 may be employed, or a screw or other means may be passed through the opening 18ª or any ear to secure the same to a surface. It will be understood that the mode of securing an ear of the supporting member to a surface may take a great variety of forms.

In the structure shown in Figs. 8 and 9, it will be noted that the ears may be brought together at an acute angle. By multiplying the number of ribs and recesses, the arc of the angle can be considerably reduced.

If desired, the socket may be frusto-conical with the bottom laminated, and the grooves extending along the walls of the cone will receive corresponding ribs carried by a corresponding projection upon the ear of another member.

It will further be understood that the ears may, if desired, be provided with corresponding square, rectangular, or polygonal openings, and a square, rectangular, or polygonal bolt or other-shaped connecting member may be used to unite the overlapping ears and confine them against relative rotation within the same plane.

With the structures described, it will be noted that the members may be brought together in a variety of relative positions; that is, in the structure shown in Figs. 1 to 7 and in Figs. 10 and 11, the members may be connected at different angles of 45°; while in the structure shown in Figs. 8 and 9, the members may be united with respect to each other at angles less or greater than 45°. The supporting bracket 30, or any other suitable supporting means, can be connected to the conduit supporting member or to any group of conduit supporting members united in any desired angular arrangement so that the member or group of members depend from the bracket in any desired position or shape. The supporting bracket may be connected to the end of a series of united members or to any intermediate ear within the series of connected members.

It is impractical to illustrate the great variety of forms in which the members may be assembled and the various possible combinations. Those skilled in the art can readily see the many possible combinations, and a further description is believed unnecessary.

While in the illustrations given, I have shown a complete ring for supporting a conduit, it will be understood that a partial ring or arcuate arm will suffice for the purposes of the invention, and in the use of the word "opening" as employed in the claims, I intend to cover such supporting arms, as well as complete cylndrical or rectangular rings.

It will also be noted that the form of the member, the relative arrangement of the ears and the body, the contour of the socket and of the projection, the adding or elimination of ribs and other engaging parts, can be widely varied without departing from the spirit of the invention.

I claim:

1. In a device of the character set forth, a plurality of conduit supporting members, each having an opening through which a conduit may pass and each having at least two angularly-related ears, one of said ears being provided with a socket having angular portions and another of said ears having an angular projection adapted to be received within the socket of a similar member, and means for securing the projection of one member within the corresponding socket of another.

2. In a device of the character set forth, a plurality of conduit supporting members, each having an opening through which a conduit may pass and each having at least two angularly-related ears, each of said ears having on one side thereof a socket and on the other side thereof a corresponding projection, the socket of one member being adapted to receive the projection of another member in such a manner as to prevent relative rotation of the members within the same plane.

3. In a device of the character set forth, a plurality of conduit supporting members, each having an opening through which a conduit may pass and each having at least two angularly-related ears, each of said ears being provided with a socket having an angular outline and with a projection of corresponding outline whereby the socket carried by the ear of one member will receive the projection carried by the ear of another member.

4. In a device of the character set forth, a plurality of conduit supporting members, each having an opening through which a conduit may pass and each having at least two angularly-related ears, each ear having a socket on one side and a corresponding projection on the other, and the position of the socket and projection on one ear being the reverse of that on the other ear.

5. In a device of the character set forth, a pluralty of conduit supporting members, each having an opening through which a conduit may pass and each having at least two angularly-related ears, each ear having a socket on one side and a corresponding projection on the other, the position of the socket and projection on one ear being the reverse of that on the other ear, and means for securing together the projection of one ear interlocked with the socket of another ear.

6. In a device of the character set forth, a plurality of conduit supporting members, each having an opening through which a conduit may pass and each having at least two angularly-related ears, each of said ears being provided with a socket on one side and a projection on the other, angular recesses merging with said socket and corresponding angular ribs merging with said projection, the position of said parts on one ear being the reverse of the parts on the other ear.

7. In a device of the character set forth, a plurality of conduit supporting members, each having an opening through which a conduit may pass and each having at least two angularly-related ears, each of said ears being provided with a socket on one side and a projection on the other, radial angular recesses merging with said socket and corresponding radial angular ribs merging with said projection, the position of said parts on one ear being the reverse of the parts on the other ear, said ribs being substantially uniformly spaced apart and being arranged at acute angles with respect to each other and said recesses being correspondingly spaced and arranged.

8. In a device of the character set forth, a plurality of conduit supporting members, each having an opening through which a conduit may pass, and each having at least two angularly-related ears, each of said ears having on one side a socket portion and on the other side a projection portion and being provided with angular interlocking members for preventing relative rotation of interlocked members within the same plane, at least three of said ears being brought into interlocked position, and means for securing said ears together.

9. In a device of the character set forth, a plurality of conduit supporting members, each having an opening through which a conduit may pass and each having at least two angularly-related ears, each of said ears having a socket portion of an angular shape on one side and a corresponding projecting portion on the opposite side and the position of said socket and projection on one ear of a member being the reverse of that of the other ear, means for bringing a plurality of said members together with interlocking socket and projection portions, and means for selectively securing the interlocked members together with the said openings in closely spaced arrangement or in widely-spaced arrangement.

10. In a device of the character set forth, a plurality of socket supporting devices, each provided with an opening through which a conduit may pass, each of said devices being provided with at least two ears and each of said ears being provided with a projection and a socket portion, and a supporting bracket equipped with a depending member having therein a portion adapted to interlock with a mating portion on an ear of one of said conduit supporting devices, and means for securing said mating members together.

11. In a device of the character set forth, a plurality of conduit supporting members, each having an opening through which a conduit may pass and each having at least two angularly-related ears, one of said ears being provided with a perforated portion adapted to be brought into alignment with a similar portion of an ear carried by the adjacent member, and means engaging the overlapping ears of adjacent members to secure the same to each other and to lock the members against relative rotation within the same plane.

12. In a device of the character set forth, a plurality of conduit supporting members, each having an opening through which a conduit may pass and each having at least two angularly-related ears, each of said ears being provided with an opening having angular walls, and a projecting member extending through said aligned openings and having surfaces engaging said angular walls to prevent relative rotation of said members within the same plane.

13. In a device of the character set forth, a plurality of conduit supporting members, each having an opening through which a conduit may pass and each having at least two angularly-related ears, each of said ears being provided with a socket on one side and a projection on the other, radial angular recesses merging with said socket and corresponding radial angular ribs merging with said projection, said ribs being substantially uniformly spaced apart and being arranged at acute angles with respect to each other and said recesses being correspondingly spaced apart and angularly arranged, and means for selectively bringing a plurality of members together with the socket and projection portions in interlocking relation and with said openings in closely spaced arrangement or in widely spaced arrangement.

JOSEPH BANNEYER.